(12) United States Patent
Miyamoto et al.

(10) Patent No.: US 6,182,940 B1
(45) Date of Patent: Feb. 6, 2001

(54) SPACER FOR STACKING GLASS PLATES, METHOD FOR ATTACHING THE SPACER TO THE GLASS PLATE AND APPARATUS FOR ATTACHING THE SPACER TO THE GLASS PLATE

(75) Inventors: Minoru Miyamoto; Hideto Onishi; Tomoki Matsuba, all of Matsusaka (JP)

(73) Assignee: Central Glass Co., Ltd., Yamaguchi-ken (JP)

( * ) Notice: Under 35 U.S.C. 154(b), the term of this patent shall be extended for 0 days.

(21) Appl. No.: 08/972,445

(22) Filed: Nov. 18, 1997

(30) Foreign Application Priority Data

Nov. 18, 1996 (JP) .................................................... 8-306875

(51) Int. Cl.$^7$ ............................ F16M 11/00; B65G 59/00
(52) U.S. Cl. ........................................ 248/682; 414/798.9
(58) Field of Search ................................. 248/682, 206.5, 248/201, 205.1, 683, 687; 414/799, 798.9, 789.5; 221/211, 212; 901/40; 24/303, 67.9, 66.1

(56) References Cited

U.S. PATENT DOCUMENTS

| 130,756 | * | 8/1872 | Slawson ................. 248/682 |
| 3,097,406 | * | 7/1963 | Yarborough ............... 24/3.7 |
| 5,256,030 | * | 10/1993 | Tanaka et al. ........... 414/798.9 |
| 5,388,696 | * | 2/1995 | Rodriguez ............... 206/454 |
| 5,632,595 | * | 5/1997 | Mori et al. ............. 414/795.6 |
| 5,682,653 | * | 11/1997 | Berglof et al. ............ 24/303 |

FOREIGN PATENT DOCUMENTS

| 56-37937 | | 9/1981 | (JP) . |
| 61-3823 | | 2/1986 | (JP) . |
| 63-42638 | | 3/1988 | (JP) . |
| 08230964 | * | 9/1996 | (JP) . |

* cited by examiner

Primary Examiner—Anita M. King
(74) Attorney, Agent, or Firm—Griffin & Szipl, P.C.

(57) ABSTRACT

A spacer has a pair of separating members which are connected to each other to be rotatable around an axis at their one ends and a magnetic body disposed on at least one of the separating members. The spacer engages the upper periphery of a glass plate to separate a plurality of glass plates which are stacked and rested against a pallet.

4 Claims, 9 Drawing Sheets

SPACER FOR STACKING GLASS PLATES, METHOD FOR ATTACHING THE SPACER TO THE GLASS PLATE AND APPARATUS FOR ATTACHING THE SPACER TO THE GLASS PLATE

BACKGROUND OF THE INVENTION

The present invention relates to a spacer inserted between glass plates which are stacked and rested against a pallet for storage or transport, a method for attaching the spacer to the glass plate and an apparatus for attaching the spacer to the glass plate.

Glass plates under storage or transport are usually stacked and rested against a pallet. Spacers are usually inserted between the stacked glass plates to keep the glass plates separated from each other, thereby protecting the glass plates from abrasion. Various kinds of spacers have been proposed. For example, Japanese Utility Model Publication 61-3823 discloses a spacer for packing glass plates wherein the head portion of the spacer is thicker than the glass plates, the thickness of the separating portion of the spacer is larger at its part near the head portion than at its part distant from the head portion, and the head portion is provided with a hole for passing through a fastening string.

Japanese Utility Model Laid-Open Publication 63-42638 discloses an apparatus for automatically attaching a spacer to the periphery of a glass pate. The apparatus has a support plate movable in the direction of glass plate transport, a shaft attached to the support plate to extend at right angles to the direction of glass plate transport, a swing member to swing unitedly with the shaft and a clamp member attached to the swing member to reciprocate between a position where the clamp member receives a spacer and a position where the clamp member attaches the spacer to the glass plate.

Japanese Patent Publication 56-37937 discloses an apparatus for automatically attaching a spacer to the trailing periphery of a glass plate. The apparatus has a conveyer for horizontally supporting a glass plate to convey it at a predetermined speed and a spacer conveyer disposed below the glass plate to be conveyed. The spacer conveyer is supplied with a spacer at a receiving position, runs after the glass plate at a speed faster than that of the glass plate when the glass plate is conveyed above it, and engages the spacer to the trailing periphery of the glass plate.

The spacers for packing glass plates disclosed in Japanese Utility Model Publication 61-3823 abut on each other at their head portions to prevent the fastening force of the fastening string passed through the holes in the head portions from spreading to the edges and the portions near the edges of the glass plates, prevent stress concentration from occurring at the edges of the glass plates, and thereby preventing the edges of the glass plates from damage. However, the spacer is not suitable for a robotized automated operation for loading the glass plates on the pallet and unloading the glass plates from the pallet because the fastening string must be passed through the holes in the head portions of the spacers.

Glass plates, especially those used for windows of motorcars, are often coated with decorative prints by ceramic ink, etc., at their peripheries or film-like heaters adhered to their peripheries. The glass plates, after they have gone through the printing process, advance to a bending and reinforcing process. Provided the production line of the glass plate is such that the printing process is not continuously connected to the bending and reinforcing process, the glass plates that gone through the printing process are temporarily stacked and rested against a pallet to be transferred to the bending and reinforcing process. When the glass plates are temporarily stacked and rested against a pallet, spacers are attached to the upper peripheries of the stacked glass plates to separate them from each other thereby protecting them from abrasion and damage. The spacer disclosed in Japanese Utility Model Laid-Open Publication 63-42638 has a "u" shaped cross section and is forced against the periphery of the glass plate at its open end to engage it. Thus, the spacer disclosed in Japanese Utility Model Laid-Open Publication 63-42638 may damage the film or the print adhered to the periphery of the glass plate. The space between the two opposing legs of the "u" shaped spacer decreases after a number of times of clamping by the clamp member. If the spacer is made of hard material so as to prevent deformation caused by the clamping, the spacer may damage the periphery of the glass plate.

The spacer disclosed in Japanese Patent Publication 56-37937 also has a "u" shaped cross section and is forced against the periphery of the glass plate at its open end to engage it. Thus, if the glass plate is coated with a film or a print at its periphery, the spacer may damage the film or print.

SUMMARY OF THE INVENTION

An object of the present invention is to provide a spacer which can be attached to the periphery of a glass plate to separate stacked glass plates from each other when they are under storage or transportation without damaging a film or a print coating the periphery of the glass plate.

Another object of the present invention is to provide a method for attaching the spacer to the glass plate.

Still another object of the present invention is to provide an apparatus for attaching the spacer to the glass plate.

According to the present invention, there is provided a spacer for engaging the upper periphery of a glass plate to separate a plurality of glass plates which are stacked and rested against a pallet, comprising a pair of separating members which are connected to each other to be rotatable around an axis at one of their ends and a magnetic body disposed on at least one of the separating members.

The spacer in accordance with the present invention can be attached to a glass plate easily by the steps of opening the spacer formed like a hinge, engaging the opened end of the hinge-like spacer with a peripheral portion of the glass plate, and closing the opened end of the hingelike spacer. The spacer engages the periphery of the glass plate at its widely opened end, and then the widely opened end is closed. Thus, the spacer does not abrade and damage the print or the film provided on the periphery of the glass plate. The spacer can be opened easily by attracting the magnetic body by means of a magnet and closed easily by releasing the magnetic force of the magnet to allow the spacer to close under its own weight.

According to a preferred embodiment of the present invention, each of the separating members is provided with a thick portion at its one end opposite to the connected end.

According to another preferred embodiment of the present invention, each of the separating members is provided with a protrusion at its one end opposite to the connected end. When the spacer clamps a peripheral portion of the glass plate, the thick portion or the protrusion abuts on the glass plate. The portion of the separating plates other than the thick portion or the protrusion are kept apart from the glass plate. Thus, the spacer does not abrade and damage the print or the film provided on the periphery of the glass plate.

According to still another preferred embodiment of the present invention, the separating member is made of resin or rubber and the magnetic body is adhered to the separating member or embedded in the separating member.

According to another aspect of the present invention, there is provided a method for attaching the spacer of the present invention to a glass plate, comprising the steps of horizontally positioning the glass plate, horizontally positioning the spacer with its separating member having the magnetic body located above the other separating member, attracting the magnetic body upward by means of a magnet to open the spacer, moving the spacer toward the glass plate to engage the open end of the spacer with a peripheral portion of the glass plate, and releasing the magnetic force of the magnet to allow the spacer to clamp the periphery of the glass plate under its own weight.

According to still another aspect of the present invention, there is provided an apparatus for attaching the spacer of the present invention to a glass plate, comprising means for horizontally positioning the glass plate, means for horizontally positioning the spacer with its separating member having the magnetic body located above the other separating member, magnetic means for attracting and releasing the magnetic body to open and close the spacer and means for moving the spacer toward the glass plate to engage the open end of the spacer with a periphery of the glass plate.

In accordance with the method or the apparatus in accordance with the present invention, the spacer engages the periphery of the glass plate at its widely opened end, and then the widely opened end is closed. Thus, the spacer does not abrade and damage any print provided on the periphery of the glass plate.

Further objects, features and advantages of the present invention will become apparent from the Detailed Description of the Preferred Embodiment when read in conjunction with the accompanying drawings.

DETAILED DESCRIPTION OF THE PREFERRED EMBODIMENTS

A spacer in accordance with a preferred embodiment of the present invention will be described.

Figure 1:
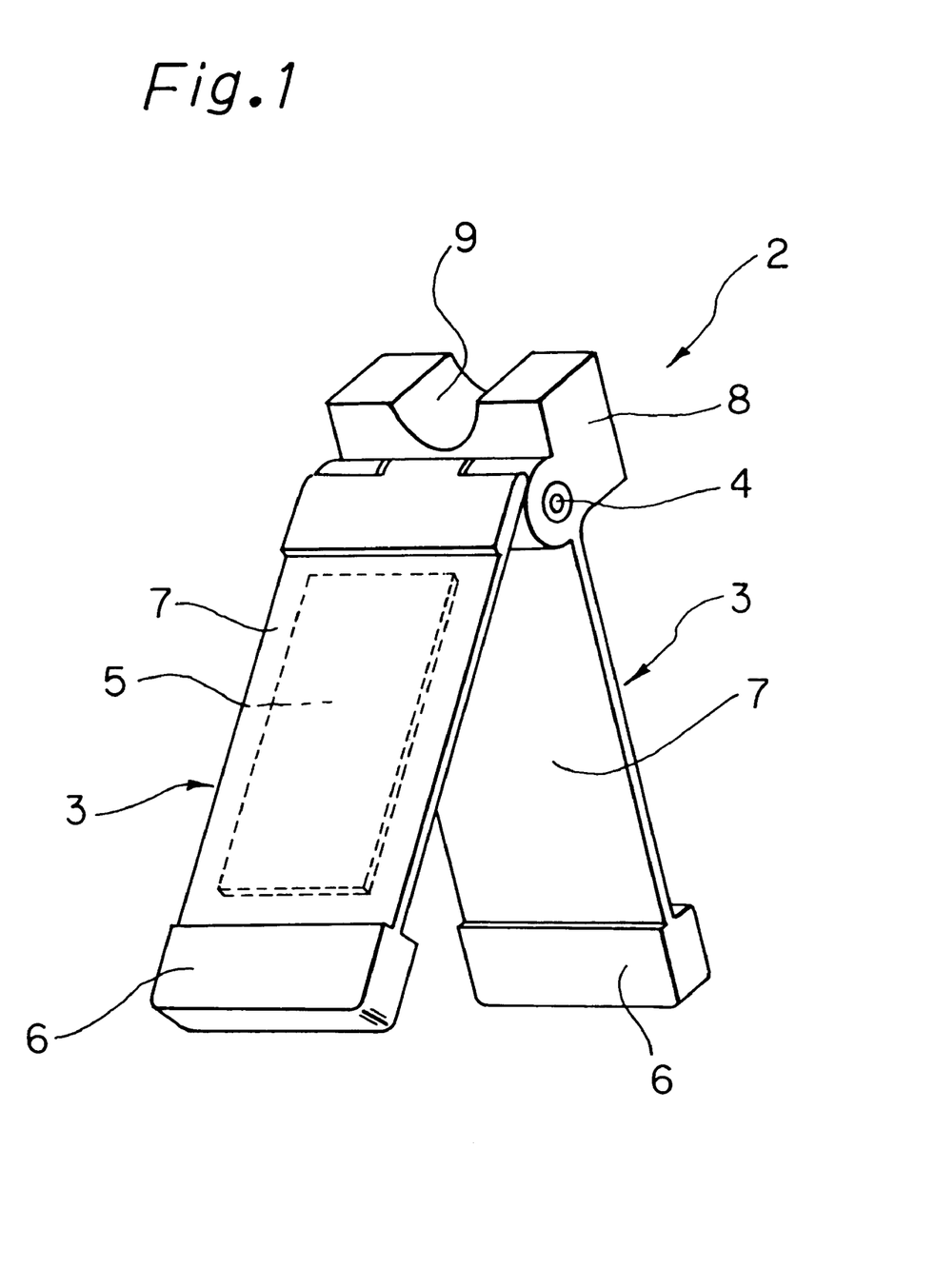
FIG. 1 is a perspective view of a spacer in accordance with a preferred embodiment of the present invention.
Figure 2:
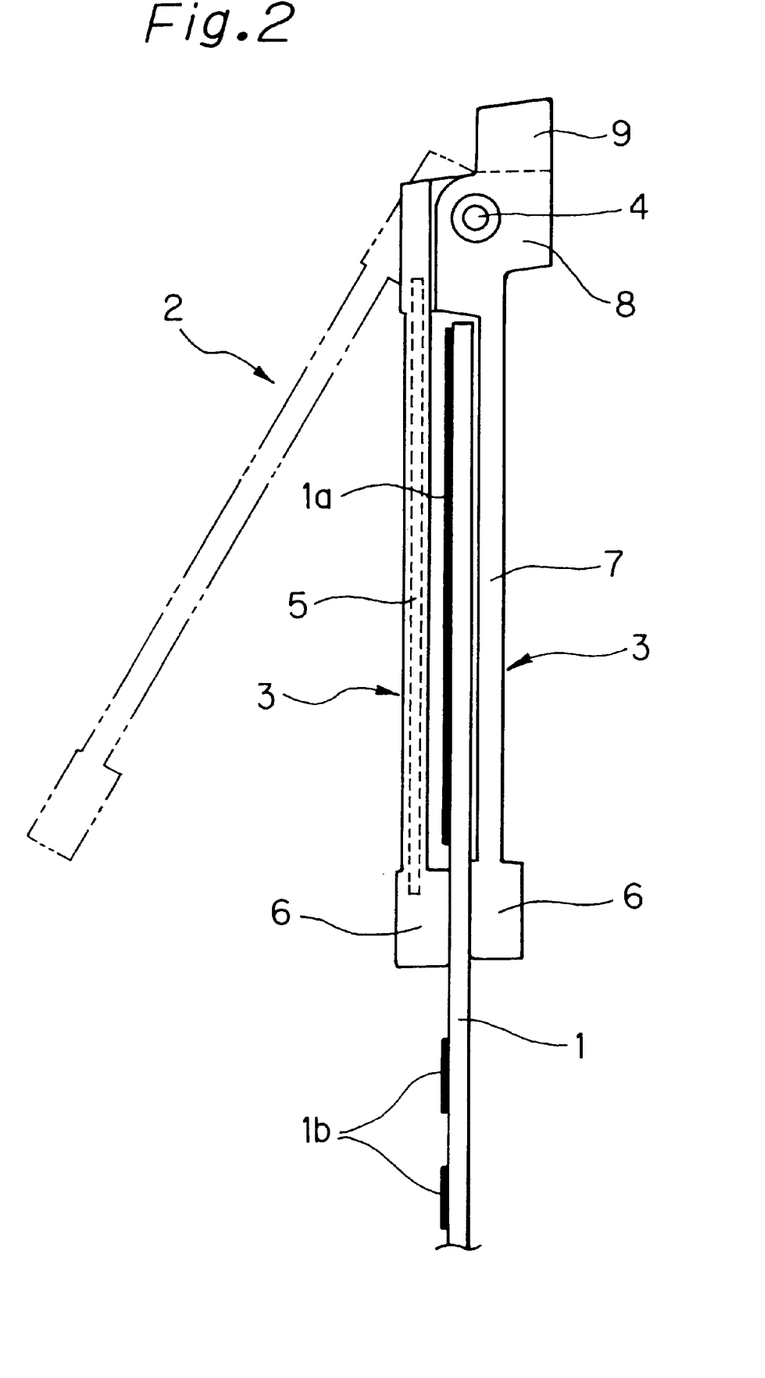
FIG. 2 is a side view of the spacer of FIG. 1.

As shown in FIGS. 1 and 2, a spacer 2 in accordance with a preferred embodiment of the present invention has a pair of separating members 3 made of polyethylene resin or rubber. The separating members 3 are connected to each other at their one ends to be rotatable around an axis thereby defining a hinge which can open and close around a shaft 4. One of the separating members 3 is provided with a panel magnetic body 5 made of magnetic metal such as iron. The magnetic body 5 may be adhered to the separating member 3 or embedded in the separating member 3.

Figure 3:
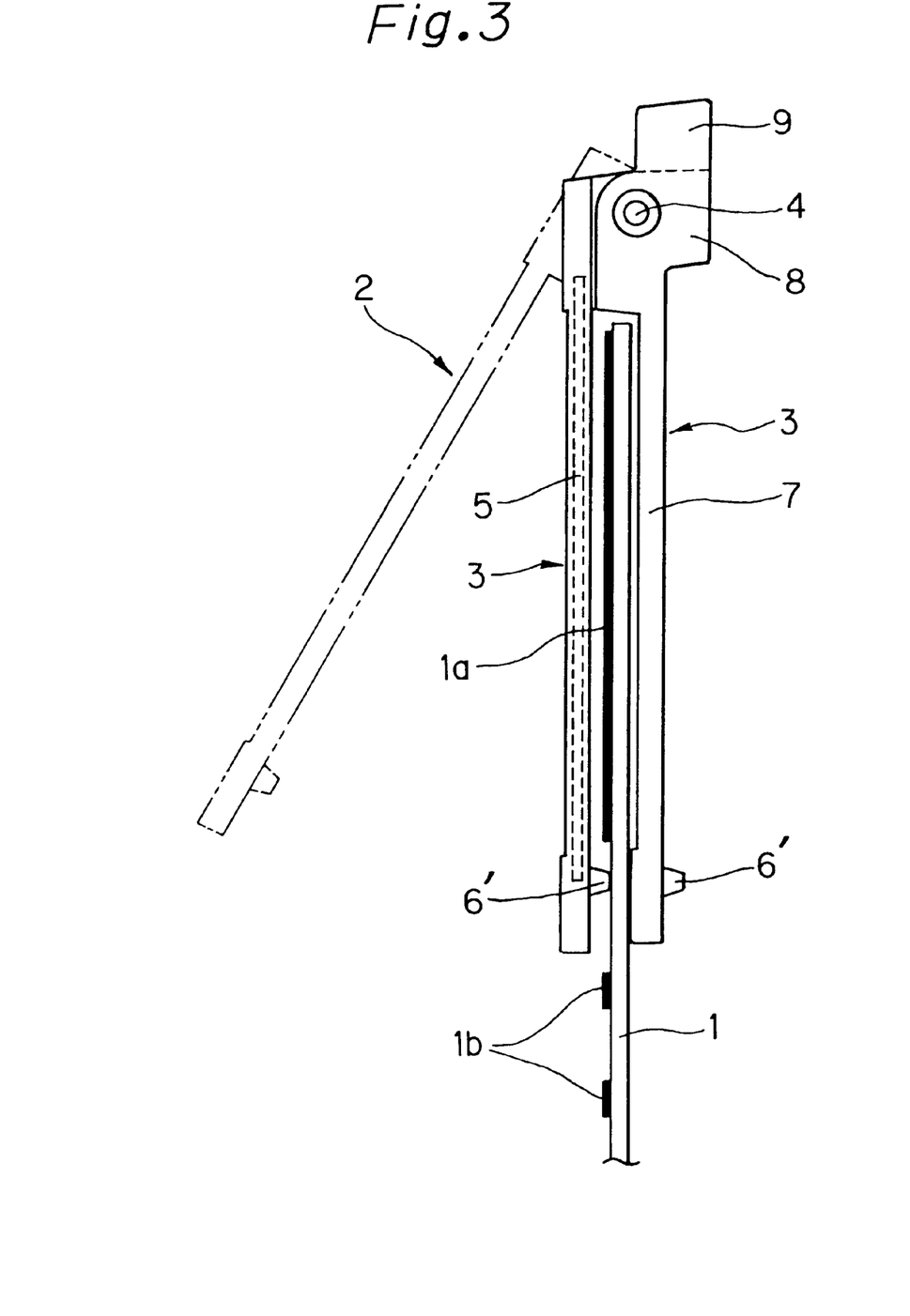
FIG. 3 is a side view of a spacer in accordance with another preferred embodiment of the present invention.

Each separating member 3 is provided with a thick portion 6 at its free end. The thick portion 6 is formed on at least one side of the free end of the separating member 3. The separating member 3 may be provided with a protrusion 6' at its free end as shown in FIG. 3. The protrusion 6' is formed on at least one side of the free end of the separating member 3. The separating member 3 is provided with a thin portion 7 between the connected end and the free end. The connected end of the separating member 3 not provided with the magnetic body 5 forms a head portion 8 of the spacer 2. The head portion 8 is provided with a concave 9.

The spacer 2 can be attached to a glass plate 1 easily by the steps of opening the spacer 2 formed like a hinge, engaging the opened end of the hinge-like spacer 2 with a peripheral portion of the glass plate 1, and closing the opened end of the hinge-like spacer 2. The spacer 2 engages the periphery of the glass plate 1 at its widely opened end, and then the widely opened end is closed. Thus, the spacer 2 does not abrade and damage print 1a provided on the periphery of the glass plate 1. When the spacer 2 clamps the periphery of the glass plate 1, the thick portion 6 or the protrusion 6' abuts on the glass plate 1. The thin portion 7 is kept apart from the glass plate 1. Thus, the spacer 2 does not abrade and damage print 1a provided on the periphery of the glass plate 1.

The spacer 2 can be opened easily by attracting the magnetic body 5 by means of a magnet and closed easily by releasing the magnetic force of the magnet to allow the separating member 3 with the magnet body 5 to lower under its own weight.

Figure 4:
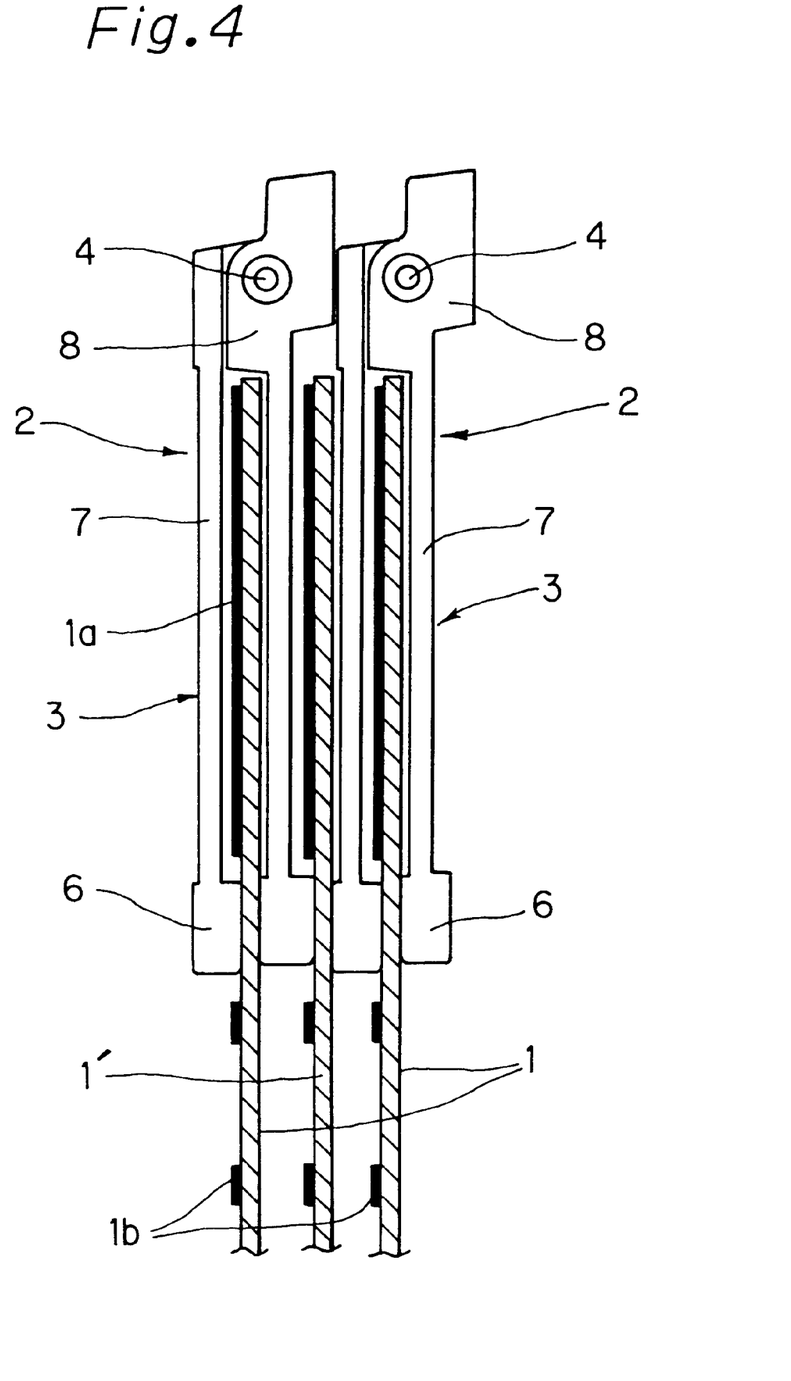
FIG. 4 is a side view of stacked glass plates provided with spacers in accordance with a preferred embodiment of the present invention.

When a plurality of glass plates are stacked, a glass plate 1' which is not clamped by the spacer 2 is put between two adjoining glass plates 1 clamped by the spacers 2 as shown in FIG. 4, that is glass plates 1 having the spacer 2 and glass plates 1' not having the spacer 2 are alternately stacked.

When a plurality of glass plates are stacked, the spacers 2 attached to the glass plates 1 are stacked so that the head portions 8 can abut on each other. If the spacers 2 are misaligned, a rod member is forced into the concaves 9 to align the spacers 2. Thus, the misaligned spacers 2 can be easily aligned.

A plurality of kinds of spacers 2 with separating members 3 of different length may be stocked to deal with a plurality of kinds of glass plates 1 with different breadths of the print 1a. The length of the separating member 3 may be made adjustable.

An apparatus for attaching the spacer 2 to the glass plate 1 in accordance with a preferred embodiment of the present invention will be described.

As shown in FIGS. 5 to 9, an apparatus for attaching the spacer 2 to the glass plate 1 comprises an apparatus 10 for positioning the glass plate 1, an apparatus 20 for positioning the spacer 2, an apparatus 30 for opening the spacer 2, and an apparatus 40 for moving the spacer 2 to the glass plate 1.

Figure 5:
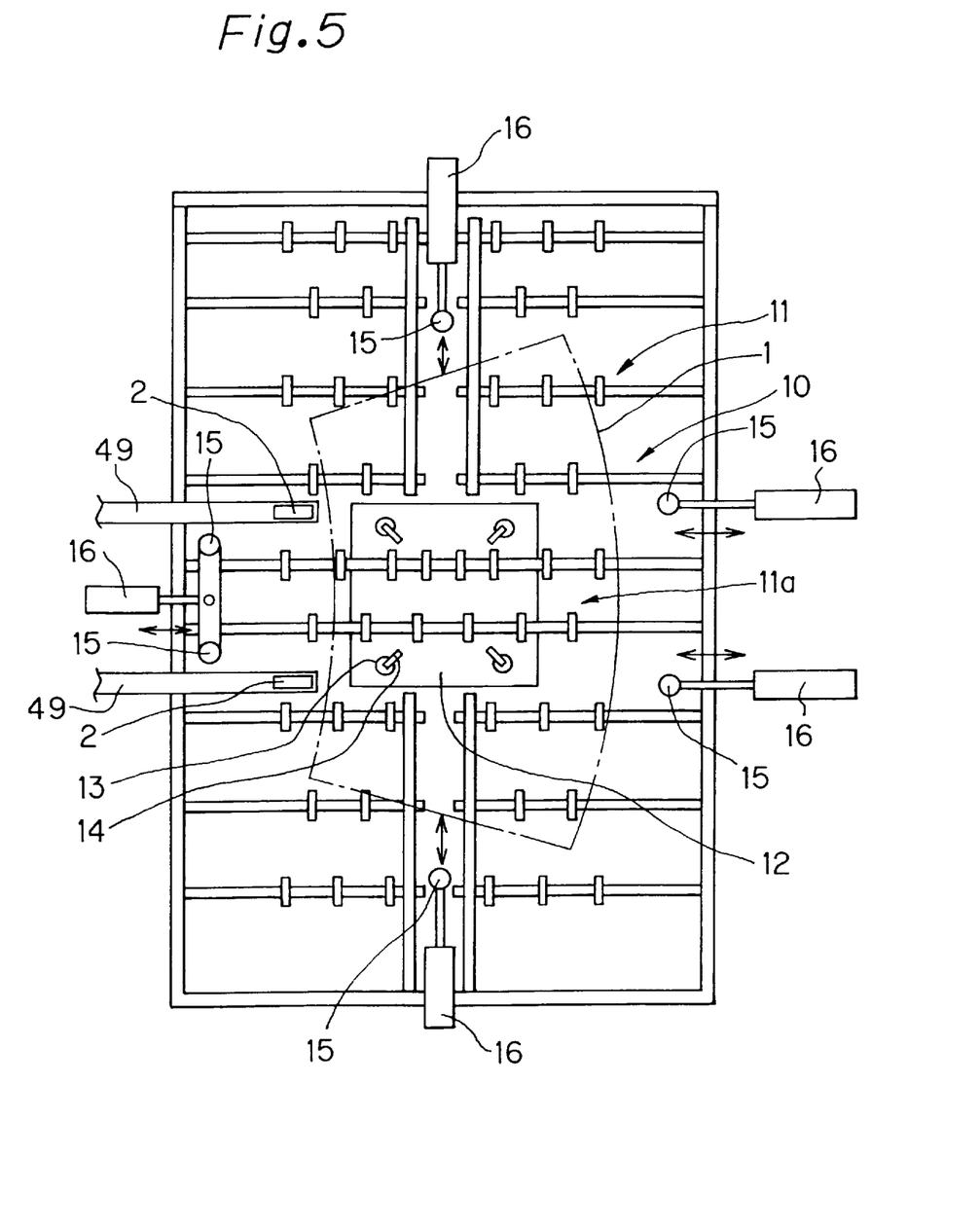
FIG. 5 is a plan view of an apparatus for positioning a glass plate which constitutes a part of an apparatus for attaching a spacer to a glass plate in accordance with a preferred embodiment of the present invention.
Figure 6:
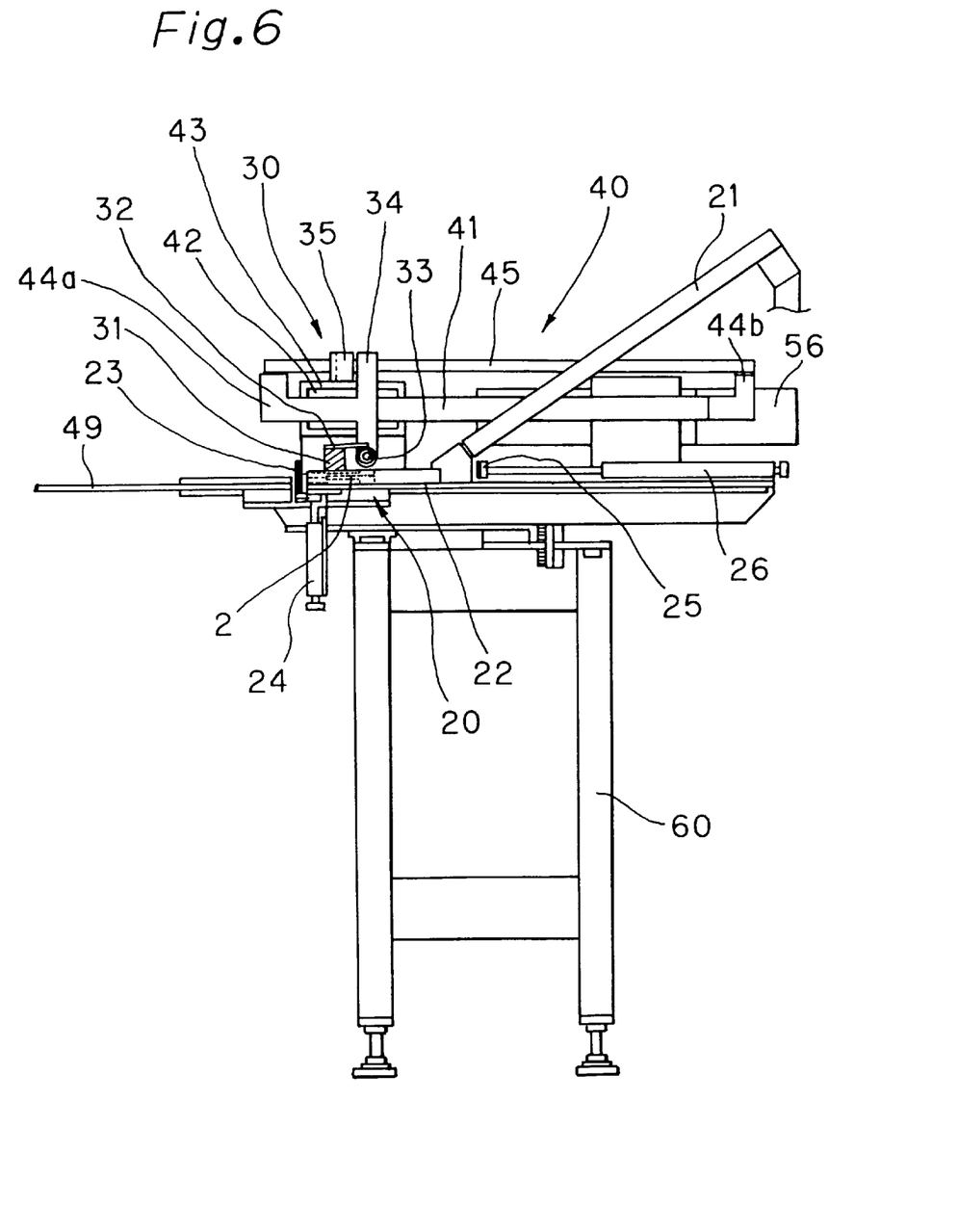
FIG. 6 is a side view of an apparatus for attaching a spacer to a glass plate in accordance with a preferred embodiment of the present invention for explaining an apparatus for positioning the spacer.

As shown in FIG. 5, the apparatus 10 for positioning the glass plate 1 has a glass plate positioning station 11a disposed in a carrier conveyer 11 for carrying the glass plate 1. A support frame 12 is disposed at the glass plate positioning station 11a below the carrier conveyer 11. The support frame 12 is driven by air cylinders to go up and down below the carrier conveyer 11. A plurality of stanchions 13 are disposed on the support frame 12. Each stanchion 13 is provided with a free caster 14 at its top. A plurality of pusher rolls 15 reciprocated by air cylinders 16 are disposed around and above the glass plate positioning station 11a.

As shown in FIGS. 6 to 9, the apparatus 20 for positioning the spacer 2 has a shoot 21. A support plate 22 is disposed below the shoot 21. A "L" shaped stopper 23 is disposed in front of the support plate 22. The stopper 23 is driven up and down by an air cylinder 24. When the stopper 23 is driven up, it protrudes above the support plate 22, and when driven down, it is level with the support plate 22. A pusher 25 driven by an air cylinder 26 is disposed at the rear portion of the support plate 22. A pair of clamp members 27 are disposed at both sides of the support plate 22. The clamp members 27 are connected to a pair of arm members 28 which are connected to a pair of opening and closing hands of a parallel opening and closing type clamp chuck 29.

The apparatus 30 for opening the spacer 2 has an electromagnet 31 connected to the lower surface of a support plate 32. The support plate 32 is supported to be rotatable by a horizontal shaft 33 which is connected to a bracket 34. An air cylinder 35 is connected to the bracket 34. The support plate 32 is connected to a downwardly directed piston of the air cylinder 35 by a chain or a wire 36.

The apparatus 40 for moving the spacer 2 to the glass plate 1 has a longitudinal sliding rail 41. The bracket 34 is connected to the sliding rail 41. The sliding rail 41 is supported to be longitudinally slidable by a guide 42 which is connected to a support plate 43. A bracket 44a is connected to the front end of the sliding rail 41. A bracket 44b is connected to the rear end of the sliding rail 41. A longitudinal sliding guide 45 is disposed in parallel with the sliding rail 41. The sliding guide 45 is connected to the bracket 44a at its front end and to the bracket 44b at its rear end. The sliding guide 45 extends through a support plate 46 connected to the support plate 43. A stopper 47 is connected to the rear portion of the sliding guide 45. The longitudinal position of the stopper 47 relative to the sliding guide 45 is adjustable. An air cylinder 48 is connected to the support plate 46. A piston 48a of the air cylinder 48 extends forward through the support plate 46. The piston 48a is connected to the bracket 44a. A support plate 49 is disposed in front of the stopper 23. The support plate 49 is level with the support plate 22.

Figure 8:
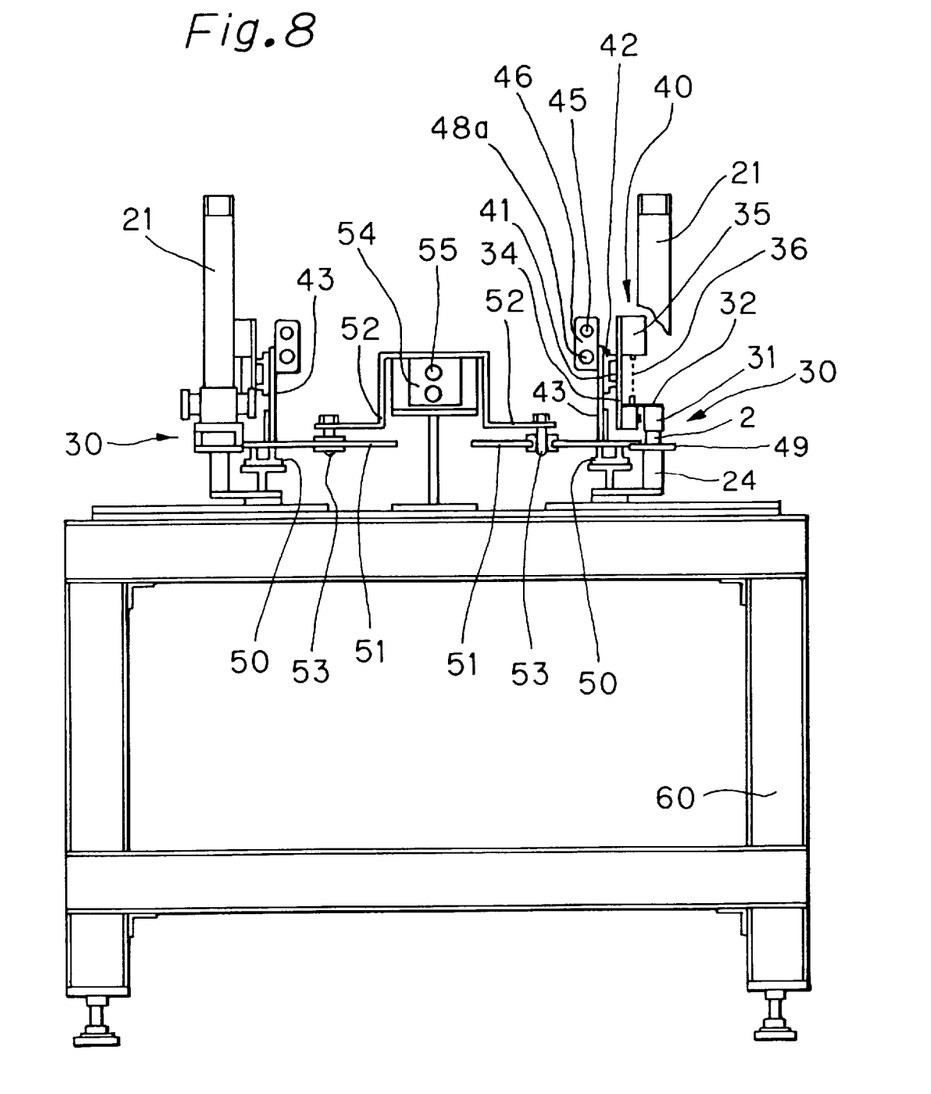
FIG. 8 is a front view of an apparatus for attaching a spacer to a glass plate in accordance with a preferred embodiment of the present invention.
Figure 9:
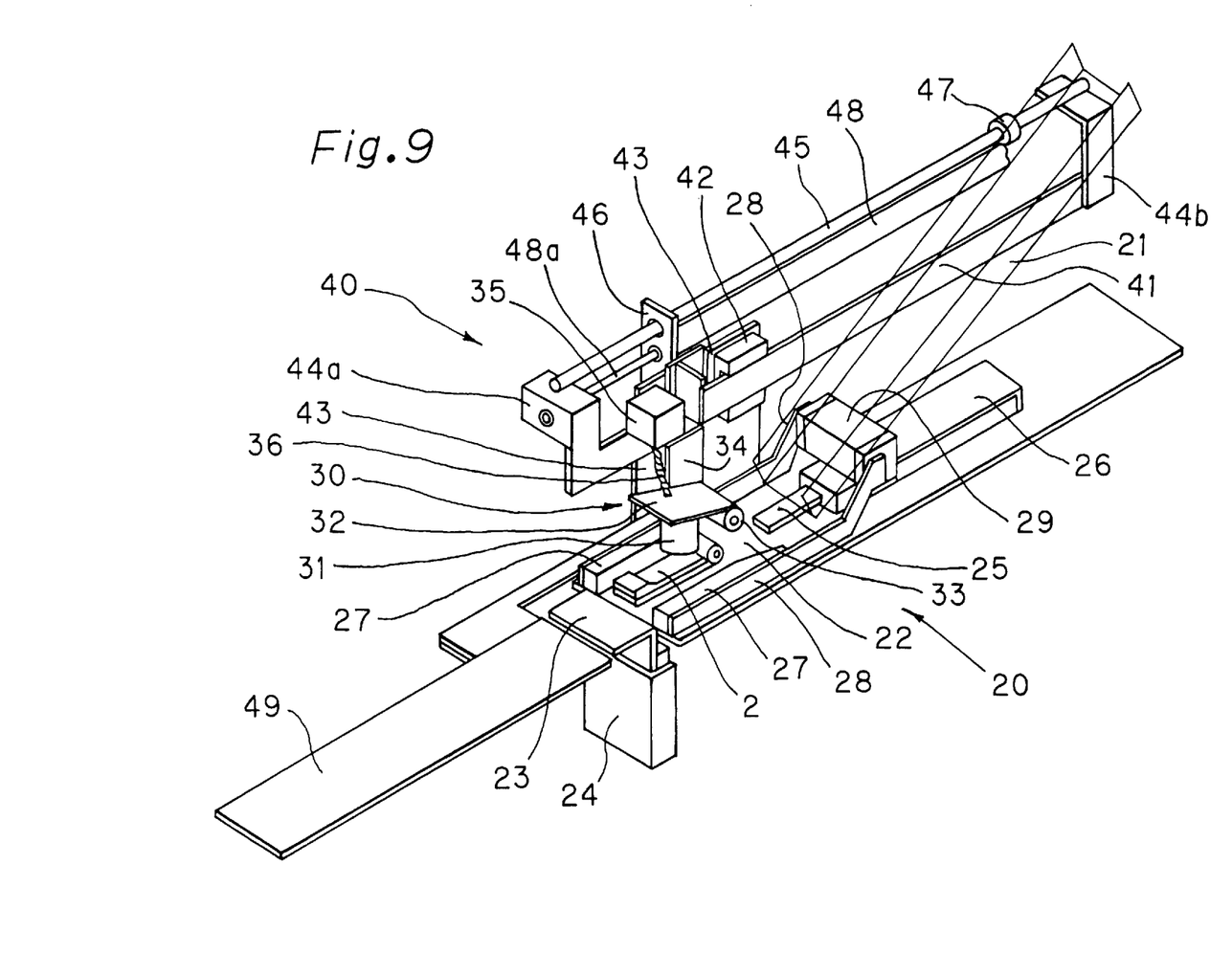
FIG. 9 is a perspective view of the principal part of an apparatus for attaching a spacer to a glass plate in accordance with a preferred embodiment of the present invention.

As shown in FIG. 8, the apparatus 40 for moving the spacer 2 to the glass plate 1 further has a guide rail 50. A base plate 51 is supported to be slidable in the longitudinal direction by the guide rail 50. The support plate 22, 43 and 49, and the air cylinder 24 are connected to the base plate 51. The base plate 51 is connected to a lever 52 through an adjusting pin 53. The lever 52 is connected to a guide nut 54. The guide nut 54 engages a ball screw 55 which is driven by a motor 56.

As shown in FIG. 8, another set of the apparatuses 20, 30 and 40 excluding the guide nut 54, ball screw 55 and the motor 56 is disposed opposite to the first set of the apparatuses 20, 30 and 40. The guide nut 54, ball screw 55 and the motor 56 belong to both the first and the second sets of the apparatuses 20, 30 and 40.

The apparatuses 20, 30 and 40 are disposed on a base 60.

As understood from FIG. 5, the apparatuses 20, 30 and 40 are disposed at one side of the glass plate positioning station 11a.

The operation of the apparatus for attaching the spacer 2 to the glass plate 1 will be described.

A flat glass plate 1 provided with a print 1a at its periphery portion and prints 1b at its center portion is carried by the carrier conveyer 11 to the glass plate positioning station 11a. The support frame 12 goes up. The stanchions 13 protrude above the carrier conveyer 11 through the spaces between the adjoining rolls of the carrier conveyer 11. The glass plate 1 is supported to be movable longitudinally and transversely by the free casters 14 disposed on the tops of the stanchions 13. The air cylinders 16 drive the pusher rolls 15 to force the pusher rolls 15 against the peripheral edge of the glass plate 1 from the front side, rear side, right side and the left side of the glass plate 1. Thus, the glass plate 1 is properly positioned.

A spacer 2 in accordance with the present invention is supplied on the support plate 22 through the shoot 21 from a spacer supply apparatus which is not shown in the Figures.

The spacer 2 lies on the support plate 22 with its separating member 3 having the magnetic body 5 located over the separating member 3 not having the magnetic body 5. The spacer 2 lies on the support plate 22 with its open end directed forward. The stopper 23 is driven up by the air cylinder 24 to protrude above the support plate 22. The pusher 25 is driven by the air cylinder 26 to move forward thereby pushing the spacer 2 in the forward direction. Thus, the stopper 23 and the pusher 25 clamp the spacer 2 from the front side and the rear side. The clamp members 27 are driven by the parallel opening and closing type chuck 29 through the arm members 28 to clamp the spacer 2 from the right side and the left side. Thus, the spacer 2 is properly positioned.

The air cylinder 35 operates. The piston of the air cylinder 35 protrudes downward. The support plate 32 connected to the piston of the air cylinder 35 through the chain or the wire 36 rotates around the shaft 33. The electromagnet 31 connected to the support plate 32 goes down to approach the spacer 2. The electromagnet 31 is supplied with electric current to become magnetized. The magnetic body 5 attached to the upper separating member 3 of the spacer 2 adheres to the electromagnet 31. The piston of the air cylinder 35 retracts upward to rotate the upper separating member 3 around the shaft 4 thereby lifting up the upper separating member 3. Thus, the spacer 2 is opened to form a ">" shaped cross section.

The stopper 23 is driven down by the air cylinder 24 to be level with the support plate 22.

Figure 7:
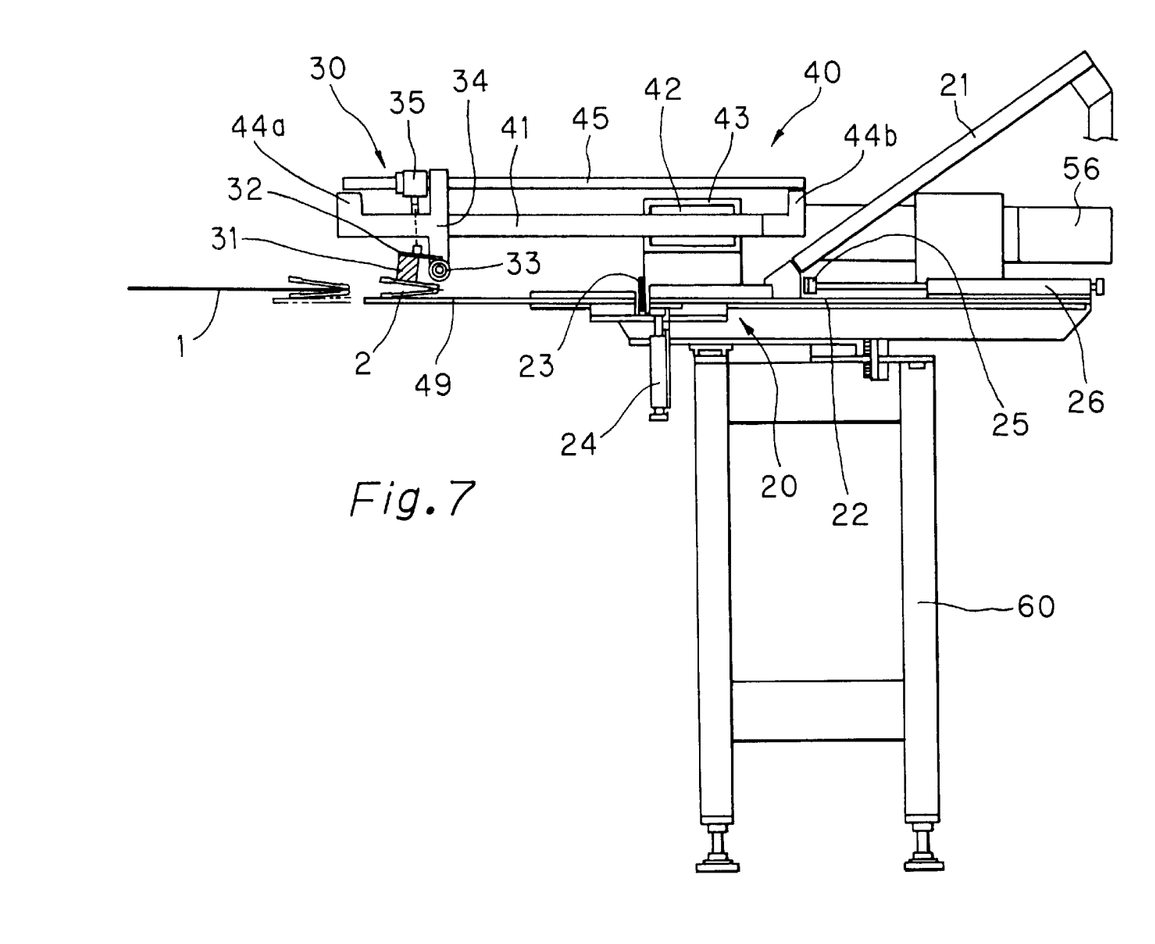
FIG. 7 is a side view of an apparatus for attaching a spacer to a glass plate in accordance with a preferred embodiment of the present invention for explaining an apparatus for attaching the spacer to the glass plate.

The air cylinder 48 operates. The piston 48a of the air cylinder 48 protrudes forward to drive the sliding rail 41 forward. The electromagnet 31 connected to the sliding rail 41 through the support plate 32, the shaft 33 and the support plate 34 is driven forward in a body with the sliding rail 41. Thus, the spacer 2, the upper separating member 3 of which adheres to the electromagnet 31, slides forward on the support plate 22, the stopper 23 and the support plate 49. When the spacer 2 reaches the front end of the support plate 49, the stopper 47 connected to the sliding guide 45 collides with the support plate 46 to stop the forward movement of the sliding rail 41. Thus, the spacer 2 stops at the front end of the support plate 49 as shown in FIG. 7.

The motor 56 operates to rotate the ball screw 55. The guide nut 54 is driven by the ball screw 55 to move forward. Thus, the electromagnet 31, the support plate 49, the spacer 2, etc. which are connected to the guide nut 54 through the base plate 51 and the lever 52 move forward in a body to approach the properly positioned glass plate 1. The opened end of the spacer 2 engages the periphery of the glass plate 1 as shown in FIG. 7. The supply of the electric current to the electromagnet 31 is stopped. The upper clamping member 3 of the spacer 2 rotates downward around the shaft 4 under its own weight. Thus, the opened end of the spacer 2 is closed. The spacer 2 is now attached to the periphery of the glass plate 1. The air cylinder 48 operates to retract the piston 48a thereby retracting the electromagnet 31 to the position where the spacer 2 is properly positioned. The support plate 49 is retained at the advanced position to support the spacer 2 attached to the periphery of the glass plate 1.

Two spacers 2 are attached to one side of the glass plate 1.

A movable robot arm, which is not shown in the Figures, approaches the glass plate 1. Magnets attached to front hands of the robot arm attract the magnet bodies 4 of the upper separating members 3 of the spacers 2. Suction pads disposed near the magnets attached to front hands attract the glass plate 1.

The pusher rolls 15 retract away from the glass plate positioning station 11a.

The movable robot arm inclines the glass plate 1 to locate the side of the glass plate 1 provided with the spacers 2 above the opposite side of the glass plate 1. The movable robot arm carries the glass plate 1 to a pallet against which the glass plate is rested. The support frame 12 of the glass plate positioning apparatus 10 goes down. The stanchions 13 and the free casters 14 go down below the carrier conveyer 11 to wait for the next glass pate 1.

The support plates 49 retract away from the glass positioning station 11a after the magnets connected to the movable robot arm attract the spacers 2 attached to the glass plate 1. The stopper 23 is driven by the air cylinder 24 to protrude above the support plate 22. The chuck 29 opens to retract the clamp members 27 away from each other. The pusher 25 is retracted rearward to wait for the next spacer 2.

In accordance with the present apparatus for attaching the spacer 2 to the glass plate 1, the spacer 2 engages the periphery of the glass plate 1 at its widely opened end, and then the widely opened end is closed. Thus, the spacer 2 does not abrade and damage print 1a provided on the periphery of the glass plate 1.

The distance between the two opposing sets of the apparatuses 20, 30 and 40 can be adjusted by means of adjusting pins 53. Thus, the distance between the two adjoining spacers 2 attached to the glass plate 1 can be adjusted.

The aforementioned apparatus for attaching the spacer 2 to the glass plate 1 can be modified to attach only one spacer 2 to the glass plate 1 or to attach more than 2 spacers to the glass plate 1.

Both of the separating members 3 of the spacer 2 may be provided with the magnetic bodies 4. In this case, the magnetic force of the electromagnet 31 should be adjusted not to attract the magnetic body 5 of the lower separating member 3.

If a permanent magnet is used instead of the electromagnet 31, the release of the magnetic force is carried out mechanically.

The present apparatus can be used for a curved glass plate as well as a flat glass plate. The present apparatus can be used for a tempered glass plate as well as non-tempered glass plate.

While the present invention has been described with reference to the preferred embodiment, one of ordinary skill in the art will recognize that modifications and improvements may be made while remaining within the spirit and scope of the present invention. The scope of the invention is determined solely by the appended claims.

What is claimed is:

1. A spacer for engaging the upper periphery of a glass plate to separate a plurality of glass plates which are stacked and rested against a pallet, comprising a pair of separating members which are connected to each other to be rotatable around an axis at their one ends and a magnetic body disposed on only one of the separating members, wherein each of the separating members is provided with a protrusion at its one end opposite to the connected end.

2. A method for attaching to a glass plate a spacer for engaging the upper periphery of a glass plate to separate a plurality of glass plates which are stacked and rested against a pallet, the spacer comprising a pair of separating members which are connected to each other to be rotatable around an axis at their one ends and a magnetic body disposed on only one of the separating members, the method comprising the steps of:

horizontally positioning the glass plate;

horizontally positioning the spacer with its separating member having the magnetic body located above the other separating member;

attracting the magnetic body upward by means of a magnet to open the spacer;

moving the spacer toward the glass plate to engage the open end of the spacer with a peripheral portion of the glass plate; and releasing the magnetic force of the magnet to allow the spacer to clamp the periphery of the glass plate by closing under its own weight.

3. An apparatus for attaching a spacer to a glass plate, wherein the spacer comprises a pair of separating members which are connected to each other to be rotatable around an axis at their one ends and a magnetic body disposed on only one of the separating members and wherein the apparatus comprises means for horizontally positioning the glass plate, means for horizontally positioning the spacer with its separating member having the magnetic body located above the other separating member, magnetic means for attracting and releasing the magnetic body to open and close the spacer and means for moving the spacer toward the glass plate to engage the open end of the spacer with a peripheral portion of the glass plate.

4. A spacer for engaging the upper periphery of a glass plate to separate a plurality of glass plates which are stacked and rested against a pallet, comprising a pair of separating members which are connected to each other to be rotatable around an axis at their one ends and a magnetic body disposed on only one of the separating members, wherein each of the separating members is provided with a thick portion extending over the whole width at its one end opposite to the connected end, the separating member is made of resin or rubber and the magnetic body is adhered to the separating member or embedded in the separating member.

\* \* \* \* \*